United States Patent [19]

Davis

[11] Patent Number: 5,597,225
[45] Date of Patent: *Jan. 28, 1997

[54] BATTERY SYSTEM FOR SUSTAINED BICYCLE PATHWAY ILLUMINATION, AND METHODS

[76] Inventor: McKay H. Davis, P.O. Box 520084, Salt Lake City, Utah 84152

[*] Notice: The term of this patent shall not extend beyond the expiration date of Pat. No. 5,426,570.

[21] Appl. No.: 554,950

[22] Filed: Nov. 13, 1995

Related U.S. Application Data

[63] Continuation of Ser. No. 401,822, Mar. 9, 1995, Pat. No. 5,523,924, which is a continuation of Ser. No. 221,208, Mar. 31, 1994, Pat. No. 5,426,570.

[51] Int. Cl.$^6$ ........................................................ B62J 6/00
[52] U.S. Cl. .................. 362/72; 362/390; 362/396; 224/414; 224/425; 224/431; 224/926; 224/929; 224/457; 280/288.4
[58] Field of Search ........................ 362/72, 390, 191, 362/396, 198; 340/432; 224/32 A, 32 R, 902; 206/333, 523; 280/288.4

[56] References Cited

U.S. PATENT DOCUMENTS

| | | | |
|---|---|---|---|
| 880,703 | 3/1908 | Wheeler et al. | 362/72 |
| 1,439,430 | 12/1922 | Lyhne | 362/72 X |
| 2,346,695 | 4/1944 | Miller | 362/370 X |
| 4,019,171 | 4/1977 | Martelet | 362/72 X |
| 4,204,191 | 5/1980 | Daniels | 362/72 X |
| 4,339,060 | 7/1982 | Braida, Jr. | 224/32 R |
| 4,390,927 | 6/1983 | Von Feldt | 362/72 |
| 4,618,081 | 10/1986 | Miree | 224/30 A |
| 4,911,339 | 3/1990 | Cushing | 280/288.4 X |
| 4,970,630 | 11/1990 | Mudrovich | 362/191 X |
| 5,066,012 | 11/1991 | Stark | 362/370 X |
| 5,181,774 | 1/1993 | Lane | 224/30 A |
| 5,247,431 | 9/1993 | Liu | 362/72 |
| 5,276,593 | 1/1994 | Lighthill et al. | 362/72 |

OTHER PUBLICATIONS

Nitefinder Catalog, Commuter Premium Dual Beam System, p. 76, Dec./1993.

*Primary Examiner*—James C. Yeung
*Assistant Examiner*—Thomas M. Sember
*Attorney, Agent, or Firm*—Foster & Foster

[57] ABSTRACT

An illumination system for a mountain bicycle is disclosed. The disclosed system comprises a long-term, high power battery pack encapsulated in an impervious jacket of compressible material, which combination is reliably and securely compression-fit into an open water bottle cage, in lieu of a water bottle, and electrically connected to a source of artificial light.

5 Claims, 2 Drawing Sheets

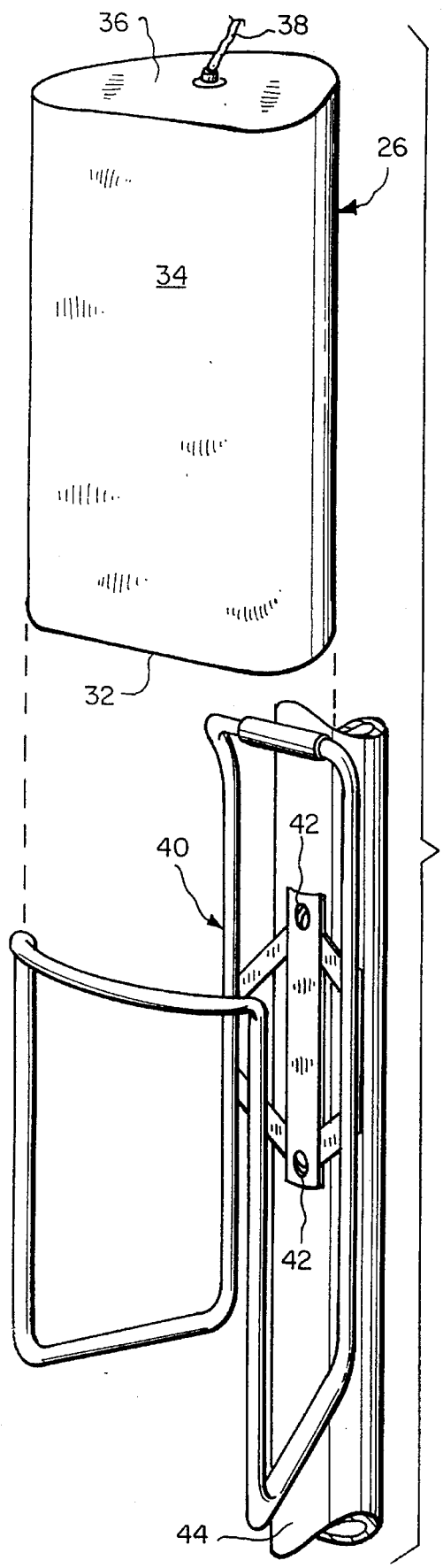
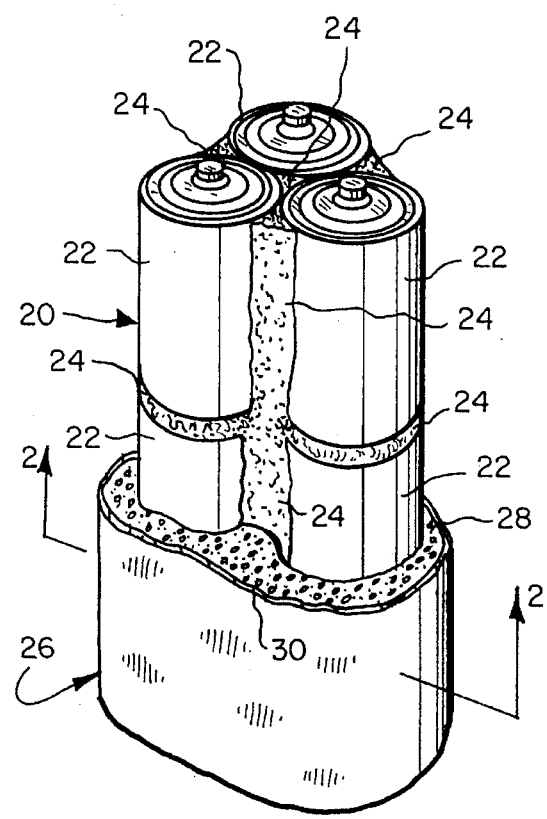
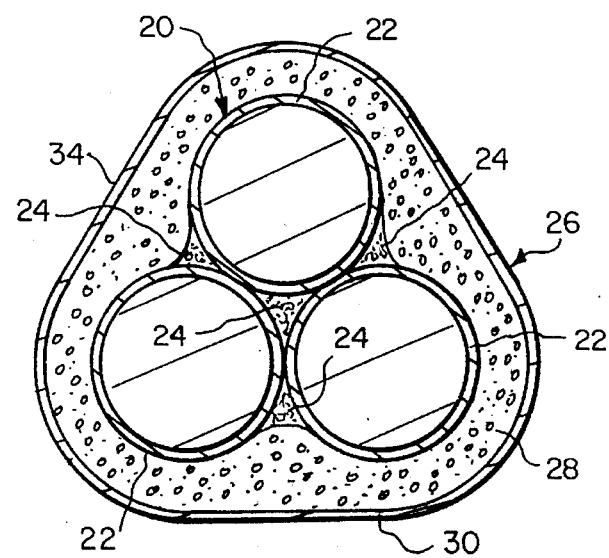
FIG. 1
FIG. 2
FIG. 3

BATTERY SYSTEM FOR SUSTAINED BICYCLE PATHWAY ILLUMINATION, AND METHODS

This application is a continuation of my U.S. patent application Ser. No. 08/401,822, filed Mar. 9, 1995, now U.S. Pat. No. 5,523,924, which is a continuation of U.S. patent application Ser. No. 08/221,208, filed Mar. 31, 1994, now U.S. Pat. No. 5,426,570.

FIELD OF THE INVENTION

The present invention relates generally to provision of illumination for a mountain bicycle and, more particularly, to a novel high power, long-term energy system for reliable and safe illumination in conjunction with night use of a mountain and other bicycle.

BACKGROUND

In recent years, it has been common place to market and thereafter use various forms of bicycles without inclusion of a source of light to accommodate night time use. Sometimes reflectors are provided at the time of purchase. From an early point in time light assemblies have been available for bicycles. These have comprised two types. One comprised a low power flashlight-type unit mounted to the handle bars or the like of a bicycle, which may provide some warning to others, but provides very little illumination to the biker independent of the terrain. The battery life of this unit has been very limited. The second light system comprised a generator, turned by contact with a tire and connected to a light bulb carried by a housing mounted to the handle bars. The amount of illumination available from this system was low. When movement of the bicycle stopped rotation of the tire also stopped; therefore, illumination was no longer available.

Recently it has been proposed that one or more batteries be manually inserted through a small diameter neck into an empty conventional water bottle, which bottle in turn is placed in a conventional water bottle cage mounted to the frame of a mountain bicycle. This approach presents significant problems. The available power is limited, creating a significant likelihood of inadequate energy to provide illumination for a long night mountain ride. Such a loss of power either isolates the rider at a fixed location along the route until daybreak or, if the rider continues, he does so at risk of personal injury and damage to the bicycle. Further, the batteries in the water bottle are not stable per se, and, therefore, they rattle around creating a risk of electrical disconnection. Significantly, particularly in mountain biking in rough terrain, the battery-containing water bottle is insecurely held in its cage. When the battery-containing water bottle bounces or is jarred out of the cage, as the bicycle traverses rough terrain, the power cord may be severed from the battery. The power cord, severed or not, may become entangled in the pedals, sprockets, chain, spokes, controls, and/or other moving parts. Thus, a serious risk of property damage and personal injury arises with this proposed approach.

BRIEF SUMMARY AND OBJECTS OF THE INVENTION

In brief summary, the present invention overcomes or substantially alleviates the problems mentioned above and provides a high power, long-term, reliable and secure electrical power source comprising part of an illumination system for a mountain bicycle or the like. In one form of the invention, a high power battery pack is reliably and securely compression-fit directly into a water bottle cage, in lieu of the water bottle, or into a like cage or carriage. An impervious jacket of compressible material surrounds the battery pack. Accordingly, the risk of inadvertent separation of the power source from its easily attained frame-supported position is virtually impossible. More than ample long-term high power is so provided to sustain long bicycle night rides over rough mountainous terrain without risk that the supply of electrical energy will expire pan way through the journey. Power supply systems according to this invention are relatively inexpensive, can be installed, removed, and replaced with ease and without specialized tools, ancillary equipment, or technical training. These novel power supply systems accommodate other applications.

With the foregoing in mind, it is a primary object of the present invention to overcome or substantially alleviate problems of the prior art.

Another important object is the provision of novel, long-term high power sources for mountain bicycles and other applications, and related methods.

A further paramount object is the provision of a novel long-term power source for a bicycle which is highly reliable and secure in its installed nature, and related methods.

It is also a significant object to provide a source of electrical power for energizing a source of substantial long-term illumination carried by a bicycle to accommodate long night rides or trips.

Another object of dominance is the provision of a battery pack comprising a pliant jacket for a bicycle which is force-fit into a water bottle cage in lieu of the water bottle itself.

A further object of value is the provision of a battery pack for compression fit reception in a cage or carriage.

Another germane object is the provision of a self-contained battery pack, useable with a mountain bike and in other applications, which is encapsulated imperviously in a jacket, which may comprise a layer of foam.

Another paramount object is the provision of a power source for intense illumination of an area adjacent to and from a position on a bicycle which presents little if any risk that the power source will become dislodged from the bicycle.

An object also of substantial significance is the provision of a source of illumination for a mountain bicycle powered by a battery pack to accommodate a long trip of many hours over mountain terrain without risk that the energy from the battery pack will expire part way through the trip.

A further primary object is the provision of an electrical power supply system for a bicycle which is inexpensive and can be installed, removed, and replaced with ease and without specialized tools, ancillary equipment, or technical training.

These and other objects and features of the present invention will be apparent from the detailed description taken with reference to the accompanying drawings.

BRIEF DESCRIPTION OF THE DRAWINGS

FIG. 1 is a perspective representation of one form of battery pack embodying the principles of the present invention, illustrated with a portion thereof broken away for clarity of illustration;

FIG. 2 is a cross-sectional view taken along lines 2—2 of FIG. 1;

FIG. 3 is an exploded perspective illustrated manner in which a battery pack, embodying the principles of the present invention, is inserted into a water bottle cage, in lieu of the water bottle;

DETAILED DESCRIPTION OF THE ILLUSTRATED EMBODIMENTS

Figure 4:
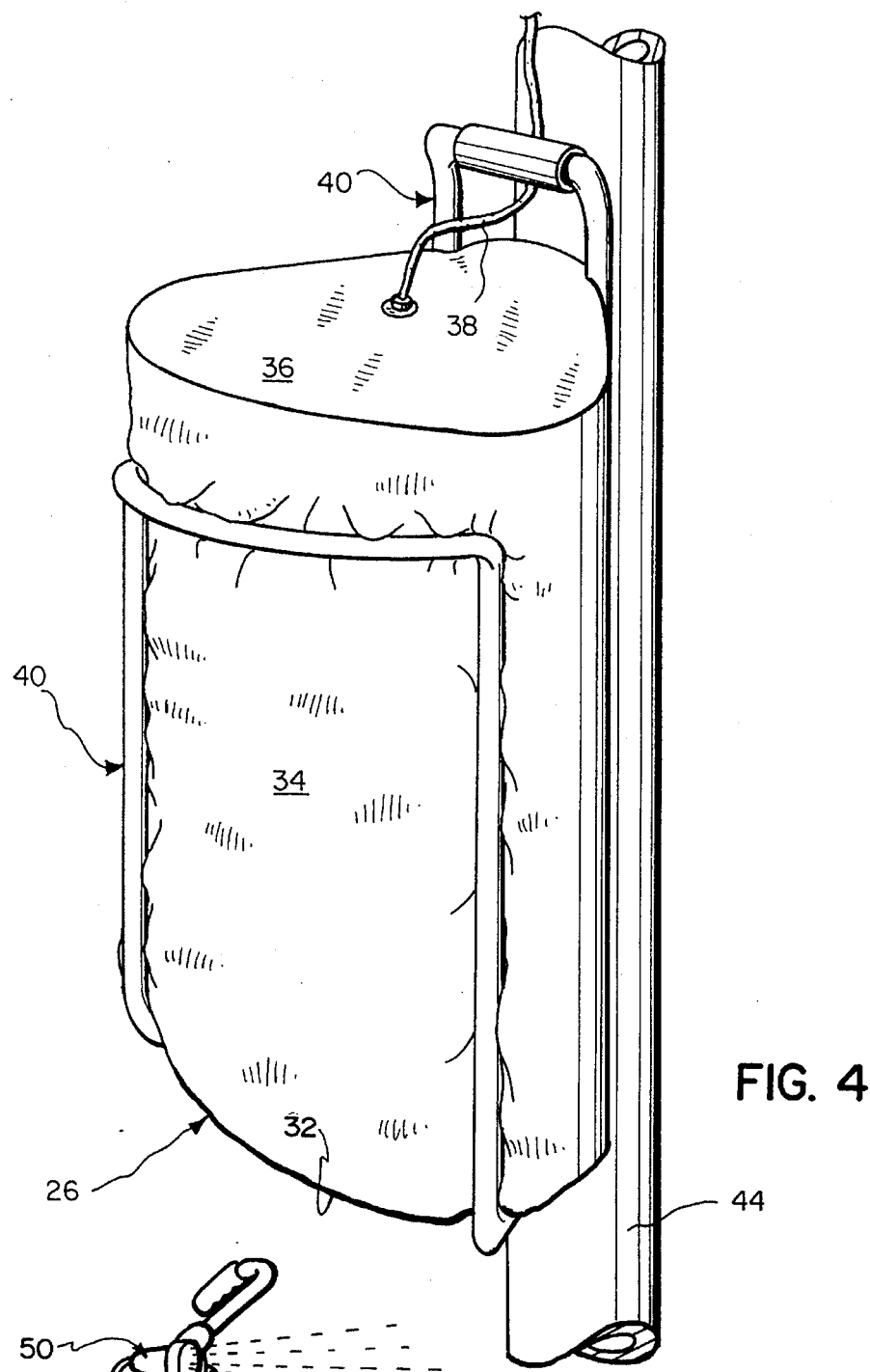
FIG. 4 is a perspective, similar to FIG. 3, but showing a battery pack, embodying the principles of the present invention, compressively, force-fit into the water bottle cage mounted to the frame of a bicycle.

Reference is now made to the drawings wherein like numerals are used to identify like parts throughout. With reference to FIG. 1, a battery pack, generally designated 10, embodying the principles of the present invention, is there illustrated. The battery pack 20 comprises a two-layer array of six batteries 22 of commercially available type, which are, when operable, electrically interconnected so as to constitute a single power source. It is preferred that the power be on the order of 20 watts. The CYCLON sealed rechargeable battery available from Gates Energy Products (two volts, 2.5 AH, and D-Cell) is satisfactory. The batteries 22 of the pack 20 are suitably held together in any desired fashion. The use of bonding material at sites 24 is satisfactory. However, other forms of packaging can be used, such as use of heat shrink plastic film.

The battery pack 20 is encapsulated on all sides, the bottom and the top by a jacket, generally designated 26, which is illustrated as comprising a layer of synthetic resinous foam 28 enclosed within the exterior layer or skin 30 of substantially solid, impervious synthetic resinous material. The jacket 26 may be formed using conventional molding techniques where the battery pack 20 is placed within the mold initially and a suitable synthetic resinous material introduced into the mold thereafter, using conventional techniques, so as to create the total encapsulation mentioned above.

Figure 5:
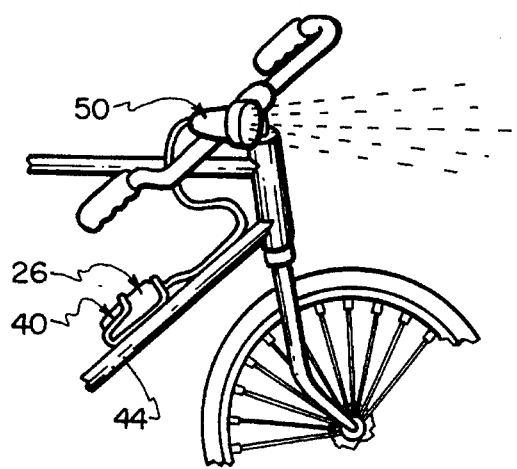
FIG. 5 is a fragmentary perspective showing an electrical connection between a battery pack, held stationary in the water bottle cage, and a pathway illuminating light connected to the bicycle.

As can be seen from FIGS. 3 and 4, jacket 26 comprises a bottom wall 32, a side wall 34, and a top wall 36, all formed of one piece so as to be impervious. An electrical cord 38 extends from the top wall 36 and is adapted to be connected to a lamp or source of illumination 50 of a bicycle see FIG. 5.

As can best be seen in FIG. 2, the external cross-sectional configuration of the jacket 26 is generally triangular, with the batteries encapsulated therein. Once the encapsulation occurs, as illustrated in FIG. 2, the jacket 26 will thereafter hold the array or pack of batteries 24 in their contiguous, stacked relationship, independent of the bonding material 24.

It is a feature of the present invention that the source of illumination embodying the principles of the present invention, such as source 20 encapsulated in jacket 26, is compression fit or force-inserted into an open water bottle cage or other like carriage, one form of which is illustrated in FIG. 3 and generally designated 40. Since cage 40 is a commercially available product, no further description is needed, except to say that it is mounted by set screws 42 to a frame member 44 comprising part of a mountain bike, for example.

When fully inserted, the jacketed battery pack is firmly and reliably held by a compression-fit within cage 40, as illustrated in FIG. 4, against inadvertent removal or dislodgment as the bicycle traverses rough mountainous terrain for any length of time.

The illustrated and described power source, so compressively held, is relatively inexpensive, requires no specialized tools for installation or removal, does not require technically trained persons to facilitate use and accommodates not only ease of installation, but facile removal and replacement once the energy within the battery pack 20 is exhausted. It is to be appreciated that the impervious nature and the reliable way the energy pack described above is held in position for use that the utility thereof is not strictly confined to mountain bikes.

The invention may be embodied in other specific forms without departing from the spirit of essential characteristics thereof. The present embodiments therefore to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A combination comprising:

a bicycle comprising a frame and a pathway illuminating light;

a water bottle cage mounted by fasteners to the frame so as to be entirely open at one end at all times;

a portable source of electrical power comprising a longitudinal axis, terminals free of contact with the water bottle cage and an external casing encasing the source of electrical power in a stationary position therein and comprising at least one exterior side surface removably force compression-fit transverse to said longitudinal axis into tight compressively contiguous relation with the water bottle cage so that (a) the terminals are adjacent to the entirely open end of the cage, (b) the one side surface of the external casing is subjected to transverse force thereby holding the power source in the water bottle cage and (c) the one side surface of the external casing is also substantially exposed to the atmosphere, the terminals being electrically connected to the pathway-illuminating light.

2. A combination according to claim 1 wherein the source of electrical power comprises a pack of interconnected batteries stationarily disposed within the external casing.

3. A combination comprising;

a bicycle comprising a frame and a pathway-illuminating light;

a water bottle cage mounted to the frame;

an electrical power source comprising a pack of interconnected batteries disposed in a stationary position within an external casing, the casing being removably force-fit into the water bottle cage so that external surface locations of the external casing are contiguously subjected to transversely directed compressive forces imposed by the water bottle cage, the source of electrical power comprising terminals;

electrical conductors interposed between the battery terminals and the light.

4. A method of providing electrical power to a bicycle light comprising the steps of:

providing at least one portable battery;

encasing the battery in a stationary position in an external casing;

removably manually force-fitting the external casing contiguously and compressively into a water bottle cage so that an exterior surface of the external casing is substantially atmospherically exposed with the remainder of the external casing engaged and compressively held by the cage;

electrically connecting the battery to the light.

5. A method of providing electrical power to a light mounted on a bicycle comprising the steps of encasing a plurality of electrically-interconnected batteries in stationary position within an external casing, removably manually force inserting the external casing contiguously into an empty water bottle cage mounted to a frame of the bicycle so as to compressively engage and hold the external casing within the water bottle cage whereby a preponderance of an external surface of the external casing is exposed to the atmosphere, and electrically-connecting the array of batteries to the light.

* * * * *